US007810107B2

(12) United States Patent
Banker et al.

(10) Patent No.: US 7,810,107 B2
(45) Date of Patent: Oct. 5, 2010

(54) DYNAMIC PORTAL REGISTRATION OF GENERIC DATA SOURCE

(75) Inventors: Ran Banker, Kfar Saba (IL); Gadi Melamed, Givat Shmuel (IL)

(73) Assignee: SAP Portals Israel Ltd., Ra'anana (IL)

( * ) Notice: Subject to any disclaimer, the term of this patent is extended or adjusted under 35 U.S.C. 154(b) by 1212 days.

(21) Appl. No.: 11/402,418

(22) Filed: Apr. 11, 2006

(65) Prior Publication Data
US 2007/0240172 A1 Oct. 11, 2007

(51) Int. Cl.
G06F 3/00 (2006.01)
G06F 9/44 (2006.01)
G06F 9/46 (2006.01)
G06F 15/16 (2006.01)

(52) U.S. Cl. .................. 719/330; 719/320; 719/328; 709/227

(58) Field of Classification Search .......... 719/320, 719/328, 330; 709/227
See application file for complete search history.

(56) References Cited

U.S. PATENT DOCUMENTS

| 5,548,506 | A | 8/1996 | Srinivasan | |
|---|---|---|---|---|
| 6,792,466 | B1 * | 9/2004 | Saulpaugh et al. | 709/229 |
| 6,898,618 | B1 * | 5/2005 | Slaughter et al. | 709/203 |
| 6,950,875 | B1 * | 9/2005 | Slaughter et al. | 709/230 |
| 6,970,869 | B1 * | 11/2005 | Slaughter et al. | 1/1 |
| 6,973,493 | B1 * | 12/2005 | Slaughter et al. | 709/225 |
| 6,980,993 | B2 * | 12/2005 | Horvitz et al. | 1/1 |

OTHER PUBLICATIONS

"Interface IConnectionProperty", SAP NetWeaver 2004S SPS 08, (J2EE Engine (Netweaver 2004S SPS 08)), Copyright 2006 SAP AG, retrieved Jun. 2, 2010, 3pgs.
"Interface IConnection PropertyGroup", SAP NetWeaver 2004S SPS 08, (J2EE Engine (Netweaver 2004S SPS 08)), retrieved Jun. 2, 2010, 1 pg.
"Interface IConnectionSpec", SAP NetWeaver 2004S SPS 09, (J2EE Engine (Netweaver 2004S SPS 09)), retrieved Jun. 2, 2010, 1 pg.
"Interface IConnectionSpecMetaData", SAP NetWeaver 2004S SPS 10, (J2EE Engine (Netweaver 2004S SPS 09)), retrieved Jun. 2, 2010, 1pg.
http://samples.gotdotnet.com/quickstart/winforms/.
http://javaboutique.internet.com/tutorials/thread0/add_java.htm.

* cited by examiner

Primary Examiner—Qing Wu
(74) Attorney, Agent, or Firm—Buckley, Maschoff & Talwalkar LLC

(57) ABSTRACT

A generic portal template includes properties that are common to all system templates. Using the generic portal template, a connector framework is exploited in order to expose every type of external information system generically and to make available to a portal its exposed metadata, methods, and other properties dynamically. The generic portal template is extendible to accommodate new properties of an external information system. The generic portal template is reusable when new external information systems are recognized. The generic portal template is especially advantageous when it is desired to access third party external information systems, such as databases or applications in a portal.

20 Claims, 4 Drawing Sheets

DYNAMIC PORTAL REGISTRATION OF GENERIC DATA SOURCE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to navigation among objects in a networked environment. More particularly, this invention relates to the establishment of connections between a networked portal and external information sources.

2. Description of the Related Art

TABLE 1

| Acronyms and Abbreviations | |
| --- | --- |
| ABAP | Advanced Business Application Programming |
| API | Application Program Interface |
| EIS | External Information Systems |
| J2EE | Java 2 Enterprise Edition |
| JCA | J2EE Connector Architecture |
| JDBC | Java Database Connector |
| JMS | Java Message Service |
| JNDI | Java Naming and Directory Interface |
| PRT | Portal Runtime Technology |

Portal-based network environments have become increasingly important, particularly in large enterprises having a diversity of computer systems. For example, such environments can now be implemented using SAP NetWeaver® portal technology, available from SAP AG, Neurottstraße 16, 69190 Waldorf, Germany. This technology supports integration and application platform requirements, and facilitates the development, deployment, and administration of enterprise services. NetWeaver portal technology uses specialized browser portlets, called "Iviews" to incorporate essentially any kind of application, information or service that can be rendered in a Web browser frame. NetWeaver portal technology also provides users with the capability of navigating among Iviews using a Web browser, and thereby obtaining coherent, portal-based views of enterprise data. Additionally, NetWeaver portal technology facilitates the creation of new computer-implemented services for the enterprise.

In addition to providing tools for creating and managing enterprise services, NetWeaver portal technology provides administrative capabilities to enable its users to access external data sources, which are backend systems, sometimes referred to herein as "external information systems" (EIS). In order to enable a seamless connection, a data source template is used to match the characteristics of the external information system and the portal. In the NetWeaver development environment, this is known as a "portal template". It is generally necessary to define a matching portal template for each type of external information system that is being accessed. To further facilitate the connection between the portal and the external information system, NetWeaver Portal technology provides a specialized architectural feature, known as the NetWeaver Connector Framework, which operates under the J2EE™ platform.

SUMMARY OF THE INVENTION

It is still a tedious and error-prone task to adapt the NetWeaver portal environment to new external information systems. Furthermore, it is often necessary to adjust portal templates when external information systems undergo modification, for example when a new version is released that has different properties or metadata from the previous version. According to disclosed embodiments of the invention, an extendible generic portal template includes properties that are common to all system templates, e.g., name, description. Using the generic portal template, a connector framework is exploited in order to expose every type of external information system generically, and to dynamically make available to a portal its exposed metadata, methods, and other properties. The generic portal template is extendible by addition of new properties by creation of links, known as "delta links", in which properties and property values are inherited from a source template by a new template that is derived from the source template. This mechanism conveniently adjusts for changes in exposed features of the external information system.

Once a generic portal template has been created, it is available for reuse when new external information systems are recognized. Indeed, the functionality of the generic portal template can be enhanced to adapt to any new backend changes and to present to the portal any new or changed properties of the external information system. The generic portal template is especially advantageous when it is desired to access third party external information systems, such as databases or applications from within the portal.

The ability to readily establish seamless portal access to new external information systems results in a more efficient way of operating an enterprise by more readily adding and modifying information systems containing information of the enterprise.

An embodiment of the invention provides a computer-implemented method for registering a data source in a portal, which is carried out by creating a connector in the portal for the data source, interrogating the data source via the connector to determine properties of the data source, and providing a generic system template that is extendible by addition of new properties. The method is further carried out by constructing a new system template that is adapted for accessing the data source via the connector, the new system template providing a reference to properties of the data source that are present in the generic system template and properties of the data source that are absent in the generic system template.

According to an aspect of the method, constructing a new system template includes placing links in the new system template to the generic system template.

One aspect of the method includes repeating the interrogation, using a new version of the data source, and constructing a second new system template that is adapted for accessing the new version of the data source. The second new system template has properties of the new version of the data source that are present in the generic system template and the first new system template and has properties of the new version of the data source that are absent in the generic system template and the first new system template.

An aspect of the method includes processing in the portal client requests to access the data source using the new system template and the connector.

In a further aspect of the method, interrogating the data source is performed using a wizard.

According to an additional aspect of the method, the connector operates in a platform-independent connector framework.

Another aspect of the method includes operating the portal in a platform-independent execution environment.

An embodiment of the invention provides a computer software product for registering a data source in a portal, including a computer-readable medium in which computer program instructions are stored, which instructions, when read by a computer, cause the computer to create a connector in the portal for the data source, wherein the portal has access to a generic system template including a plurality of properties of the data source. The generic system template is extendible by addition of new properties of the data source. The instructions cause the computer to interrogate the data source via the connector to determine properties of the data source, and to construct a new system template that is adapted for accessing the data source via the connector by augmenting the generic system template to include in the new system template data source properties that are absent in the generic system template.

An embodiment of the invention provides a portal system having a capability for registering a data source. The portal system includes a server, a client interface for linking the server to a plurality of clients via a data network, and at least one data interface for linking the server to the data source. The server is operative for executing portal runtime software. The runtime software includes a connector framework and a generic system template. The generic system template is extendible by addition of new template properties. The runtime software is operable to create a connector in the portal system for the data source, to interrogate the data source via the connector to determine properties of the data source, and to construct a new system template that is adapted for accessing the data source via the connector. The runtime software is operative to include in the new system template properties of the data source that are absent in the generic system template.

An embodiment of the invention provides a method of operating an enterprise, which is carried out by providing a portal system having a capability for registering a data source. The portal system includes a server, a client interface for linking the server to a plurality of clients via a data network, and at least one data interface for linking the server to the data source. The method is further carried out by executing portal runtime software in the server. The runtime software includes a connector framework and a generic system template. The runtime software is operative for extending the generic system template by addition of new template properties. The runtime software is operable to create a connector in the portal system for the data source, to interrogate the data source via the connector to determine properties of the data source, and to construct a new system template that is adapted for accessing the data source via the connector. The new system template includes one or more of the properties of the data source that are absent in the generic system template. The method is further carried out by connecting new data sources to the server, registering the new data sources in the portal system using the generic system template and using respective instances of the new system template. The method is further carried out by processing requests arriving at the server via the client interface from the clients for access to the new data sources to display information obtained from the new data sources in the clients.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Overview.

Figure 1:
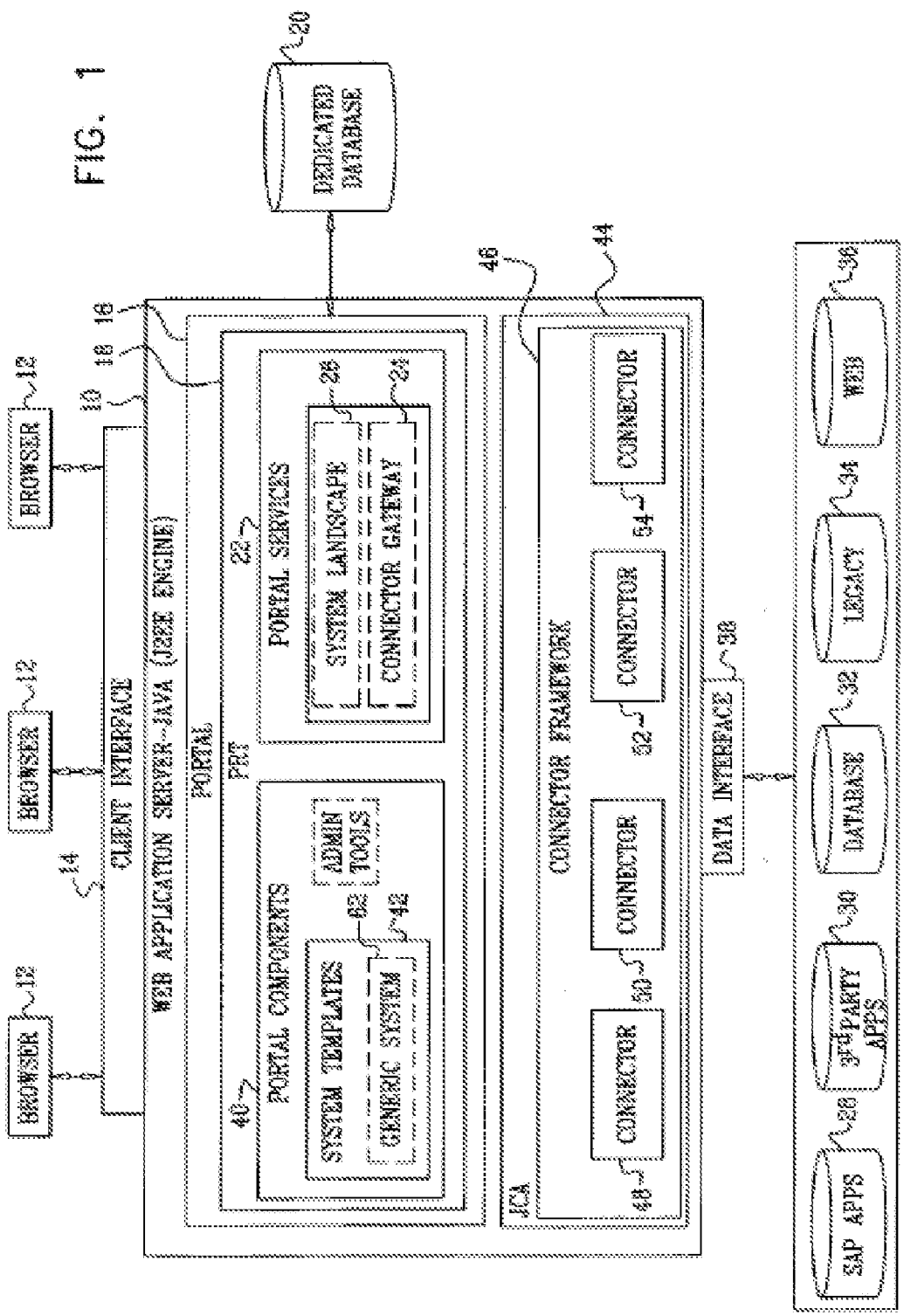
FIG. 1 is a high level block diagram illustrating a portal in accordance with a disclosed embodiment of the invention.

Turning now to the drawings, reference is initially made to FIG. 1, which is a high level block diagram illustrating a portal in accordance with a disclosed embodiment of the invention. By applying the principles of the invention to the portal, an enterprise can be operated efficiently by easily connecting new external information systems to the portal system. A web application server 10 is accessed over a data network, e.g., the Internet or a private intranet, by any number of clients or end users, each of whom has a browser 12, via a client interface 14. The server 10 is typically realized as a computer that includes a processor and a memory that contains objects corresponding to the functional blocks depicted in FIG. 1. Thus, although the server 10 is shown in FIG. 1 as comprising a number of separate functional blocks, these blocks are not necessarily separate physical entities, but rather may represent different computing tasks. These tasks may be carried out in software running on a single processor, or on multiple processors. The software may be provided to the processor or processors in electronic form, for example, over a network, or it may be furnished on tangible media, such as CD-ROM or non-volatile memory. Alternatively or additionally, aspects of the server 10 may comprise a digital signal processor or hard-wired logic.

In current embodiments, the server 10 operates under a platform-independent execution environment, J2EE under the Java™ platform, both available from Sun Microsystems Inc., Palo Alto, Calif. However, the principles of the invention may be applied to other platforms and environments in which a template is used for connectivity between a portal environment and external information systems, by effecting suitable modifications within the capabilities of those skilled in the art.

The server 10 supports a portal 16 that includes a number of portal runtime modules 18, collectively referred to as "Portal Runtime Technology" (PRT). The portal 16 can be realized using the above-noted NetWeaver portal technology.

The portal 16 is typically supported by a dedicated database 20. In general, the portal runtime modules 18 supply various services to portal users, management, and security. The portal runtime modules 18 include general portal services 22, which include a connector gateway 24, and a system landscape portal service 26. The system landscape portal service 26 is a block representing a logical, complex system, which can consist of multiple, distributed components. Some of these components may themselves be systems. Others may be services, installed products, or other managed elements. Furthermore, any of the components of the system landscape portal service 26 can be third party components, to which there is a need for seamless access and communication. The connector gateway 24 is a service that enables a connection between the portal 16 and one or more external information systems 28, 30, 32, 34, 36, using the system landscape portal service 26. The external information systems 28, 30, 32, 34, 36 are linked to the server 10 via a data interface 38 over the same or a different data network as the browser 12. An implementation of the connector gateway 24 is presented in Listing 1.

Among the portal runtime modules 18 are a group of portal components 40, including a collection of system templates 42. A system template essentially is a schema used to create a part of the portal landscape. Among the portal components 40 is a generic system template, which is the subject of some aspects of the present invention.

A simple example is a logon template for logging on to an external information system. As a further example, Listing 2 shows an exemplary system template that could be developed according to aspects of the invention, based on a generic system template.

J2EE provides a connector architecture 44, known as the "J2EE Connector Architecture" (JCA), which defines a standard scalable architecture for connecting the J2EE platform to heterogeneous external information systems. The connector architecture 44 is extended in the portal 16 by a connector framework 46, which employs generic portal templates in accordance with the invention. The connector framework 46 consists of interfaces described by the JCA specification and extensions defined by the connector framework 46.

The primary task of the connector framework 46 is to create the basic connection with one of the external information systems 28, 30, 32, 34, 36. A collection of properties, known as the "ConnectionSpecinterface" must be specified to connect to an external information system, e.g., a backend application.

A plurality of connectors 48, 50, 52, 54, which implement the connector framework 46, require certain metadata that will usually be specific. For example, metadata prescribed by the connector architecture 44, that is the JCA, include the vendor name and the version of the external information system. Metadata prescribed for the connector framework 46 include a default date and time format, the maximum number of connections allowed, default connection and query timeout intervals. The connector framework has an interface known as an "ICapabilities interface" that reflects the capabilities of a particular connector. The connectors 48, 50, 52, 54 also have a generic interface that is used to determine connector capabilities. Multilanguage support is an example of a possible capability of a connector.

In some embodiments, the connectors 48, 50, 52, 54 can be realized as the SAP Java Resource Adapter, available from SAP, AG.

Template Creation.

Figure 2:
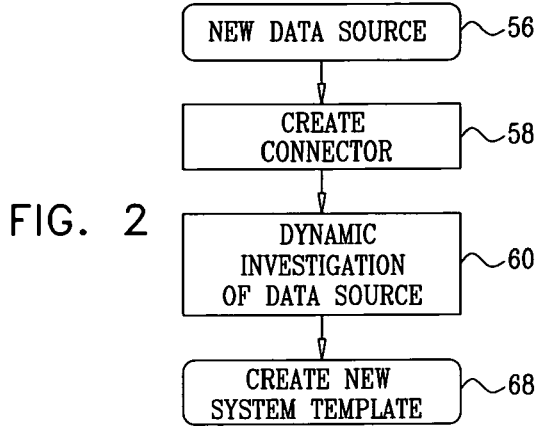
FIG. 2 is a flow chart illustrating a process wherein a generic data source undergoes dynamic portal registration in accordance with a disclosed embodiment of the invention.

Reference is now made to FIG. 2, which is a high level flow chart illustrating a process wherein a generic data source undergoes dynamic portal registration in accordance with a disclosed embodiment of the invention. The process is explained with reference to the exemplary embodiment shown in FIG. 1. At initial step 56, a new data source is recognized.

Next, step 58 begins a sequence of operations leading to the establishment of a connector, A basic connector, e.g., the connector 48, is created conventionally, using known SAP and JAVA techniques, and deployed to the server 10. The portal services 22 can access the connector using standard J2EE technologies, e.g., JNDI Lookup, and query each connector by using several known connector interfaces.

Next, at step 60, the portal services 22 use API's provided by the connector architecture 44, the connector framework 46, and the system landscape portal service 26, including the interfaces shown in Table 2. The interface IConnectionProperty provides for the definition of connection properties for the connector: user name, password, and language. The interface IConnectionProperty provides metadata to the specified connection properties. The interface IConnectionSpecMetaData describes the metadata of the connection properties. The interface IConnectionSpec is used to pass connection request-specific properties in order to obtain a connection to an instance of the new data source.

Portions of step 60 can be conducted using a wizard, which can be provided as part of the portal runtime modules 18, or can be implemented externally. In any case, the wizard creates a new connector that is adapted to the data source that was recognized in initial step 56. During its operation, the wizard makes use of the interfaces shown in Table 2. The wizard participates in creating a new system template by modification of a generic system template 62, as described in further detail below. The generic system template 62 has been constructed to be extendible by addition of newly recognized properties of an existing external information system, or to accommodate previously unknown properties of a hitherto unknown external information system. An example of a generic system template is presented in Listing 3.

Essentially, step 60 involves an interrogation of the new data source, using the connector established at step 58. The API's of the connector framework 46 (Table 2) allow generic public access to an external information system in order to determine its properties. The relevant interfaces for this step are the interfaces IConnectionProperty, IConnectionPropertyGroup, IConnectionSpec, and IConnectionSpecMetaData. The portal services 22 use these API's in order to extend the generic system template 62.

Figure 3:
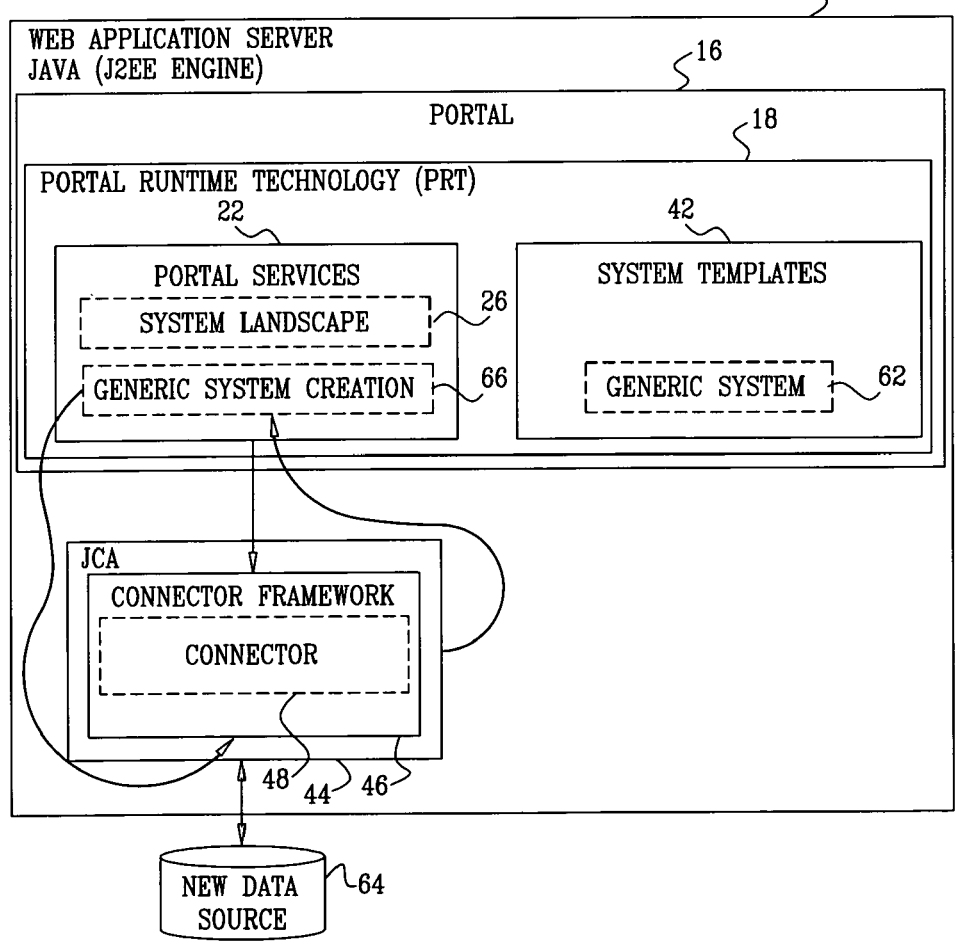
FIG. 3 is a block diagram illustrating aspects of the system shown in FIG. 1, in accordance with a disclosed embodiment of the invention.

Reference is now made to FIG. 3, which is a block diagram illustrating aspects of the server 10 (FIG. 1) relevant to step 60, in accordance with a disclosed embodiment of the invention. A new external information system, data source 64, is linked to the connector 48. Dynamic investigation of the properties of the data source 64 required for its access is represented by a generic system creation process 66, which is an aspect of the portal services 22. The connector 48 returns metadata of the relevant connection properties of the data source 64 to the process 66.

Referring again to FIG. 2, after all the properties of the new data source have been collected via the connector 48, control proceeds to final step 68. A new system template is now created, containing the properties of the generic system template 62, as well as new properties obtained in step 60. This can be implemented by copying the generic system template 62 (FIG. 1) and adding new properties, or by augmenting the generic system template 62 by establishing links between the new system template and the generic system template 62, in which case the new system template contains the new properties and references existing properties using the links. If the properties of the data source 64 are such that it is necessary to extend the generic system template 62 to accommodate the new data source, the extensions will automatically affect all system templates that may be derived from the generic system template 62 in the future. Generally, however, a "delta links" technique is used, in which new properties and values ("deltas") are added in new system templates. Modifications that are applied to the new system template properties or property values do not propagate backward, and thus do not affect the generic system template 62. If modifications to both the generic system template 62 and the new system template that derived from it are made, the changes in the new system template override any conflicting changes in the generic system template 62. Thus, only changes in the generic system template 62 that are not overridden by the changes in the new template become effective in the new template. Once the new system template has been completed, it is added to the collection of system templates 42. Clients of the server 10, e.g., the browsers 12 (FIG. 1), may now access the data source 64 using the new system template.

Figure 4:
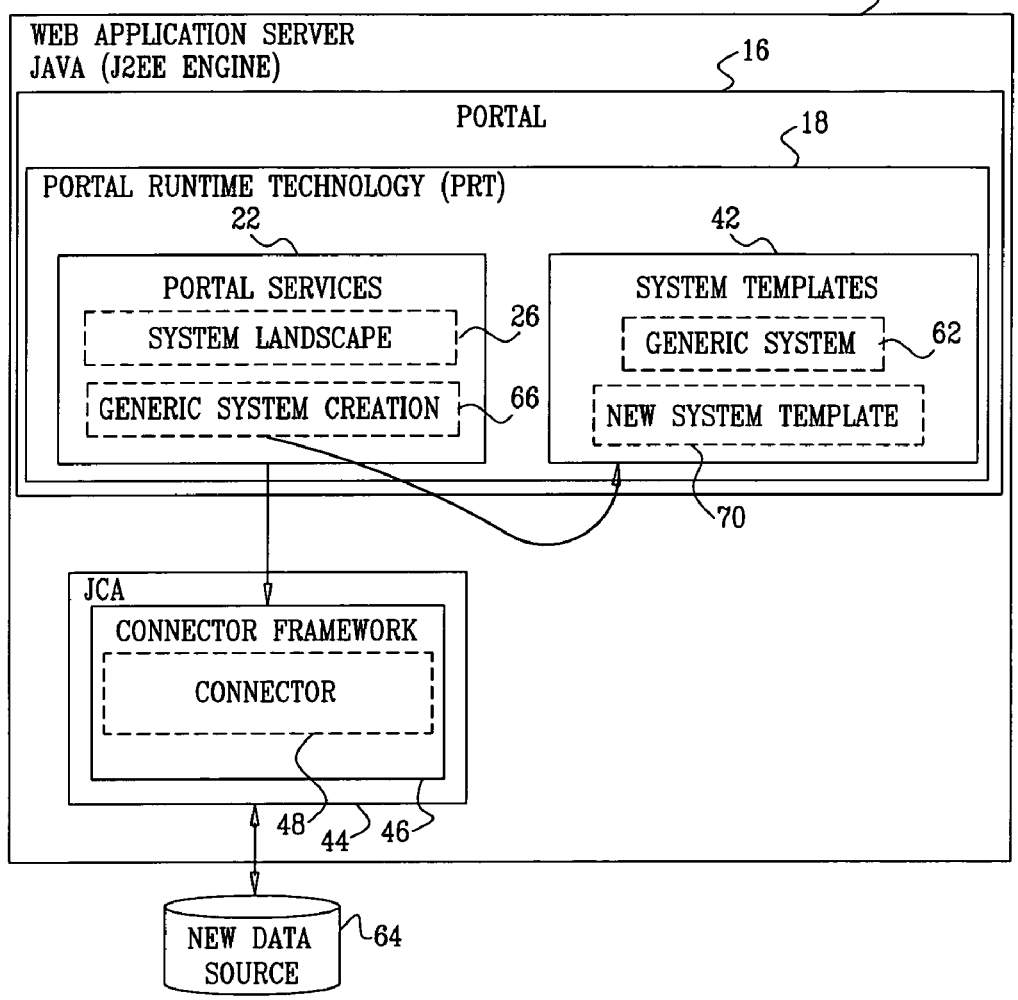
FIG. 4 is another block diagram illustrating aspects of the system shown in FIG. 1, in accordance with a disclosed embodiment of the invention.

Reference is now made to FIG. 4, which is a block diagram similar to FIG. 3, illustrating aspects of the server 10 (FIG. 1) relevant to step 68, in accordance with a disclosed embodiment of the invention. The process 66 has added a new system template 70 to the collection of system templates 42. An exemplary new system template is shown in Listing 4, and supports external Java database connector (JDBC) compliant data sources.

Dynamic Extension of Generic System Template.

During creation of the system template 70 (FIG. 4), properties of the external information system may be required that are unknown in the generic system template 62. Furthermore, after the system template 70 has been placed in operation, additional properties may be defined in the data source 64 that are unknown to the system template 70 or to the generic system template 62. Aspects of the invention provide the ability to dynamically extend the generic system template 62, as described above, and additionally to dynamically extend other system templates, such as the system template 70.

Figure 5:
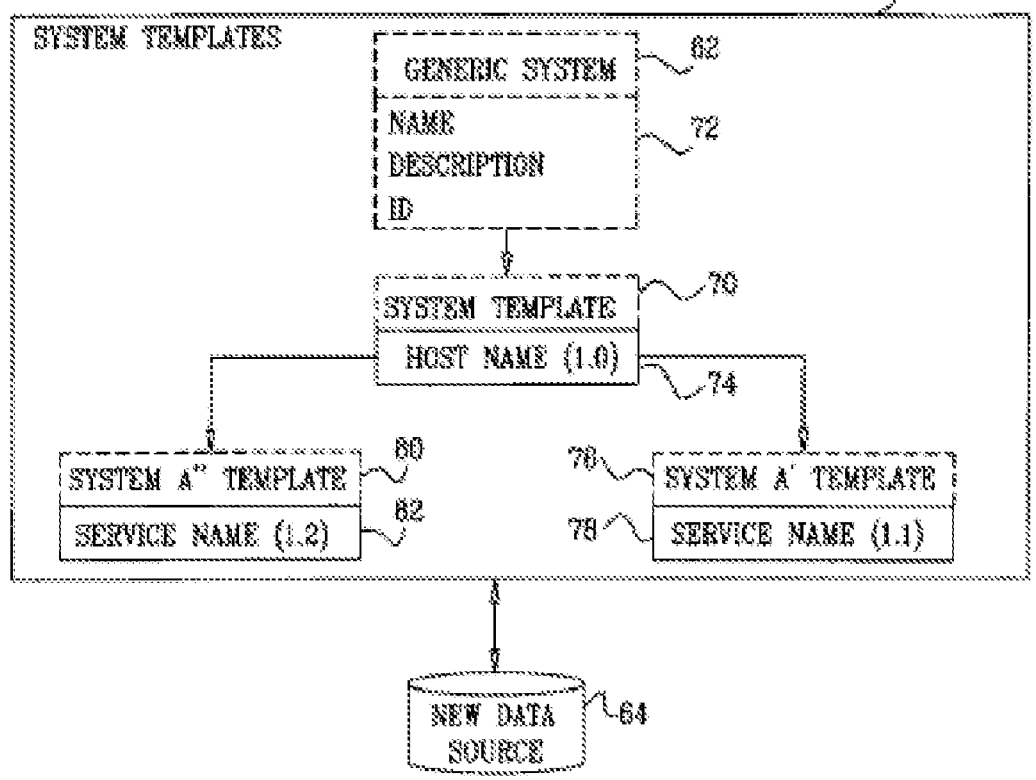
FIG. 5 is a detailed block diagram showing two types of extensions of a system template according to a disclosed embodiment of the invention.

Reference is now made to FIG. 5, which is a detailed block diagram of the system templates 42 (FIG. 4) showing two types of extensions of a system template according to a disclosed embodiment of the invention. A simplified view of the generic system template 62 is shown in FIG. 5. The generic system template 62 has a basic group of properties 72: Name; Description; and ID.

It is assumed that the system template 70 (System A Template) was created as described above with respect to FIG. 2. The data source 64, (System A), to which the system template 70 pertains was found in step 60 (FIG. 2) to have a host name property, which is not among the properties 72, and is not found in the generic system template 62. Therefore a new property 74, called "Host Name (1.0)", is included in the system template 70 as a first extension of the generic system template 62.

Assume further that after the system template 70 was created, there was a new release of the data source 64 (System A, version 1.1). An updated version of a connector for this version must now be created. To do this, the procedure described above is again followed, except that in final step 68 (FIG. 2), a new system template 76 is based on both the generic system template 62 and its extension in the system template 70. This is accomplished by adding yet another property 78 "Service Name (1.1)" to the system template 76.

As shown in the lower left corner of FIG. 5, additional variants of a connector can be developed to accommodate new releases of the data source 64. Assume that yet another release, version 1.2 of System A has issued. It contains no new properties. However, its Service Name property differs from that of version 1.0. A new system template 80 has a property 82, "Service Name (1.2)." The system template 80 is based on the generic system template 62 and the system template 70, but does not depend upon the system template 76.

In general new system templates created for the data source 64 are based on the system template 70, and their set of properties are a union of all properties of the generic system template 62 and the system template 70.

Figure 6:
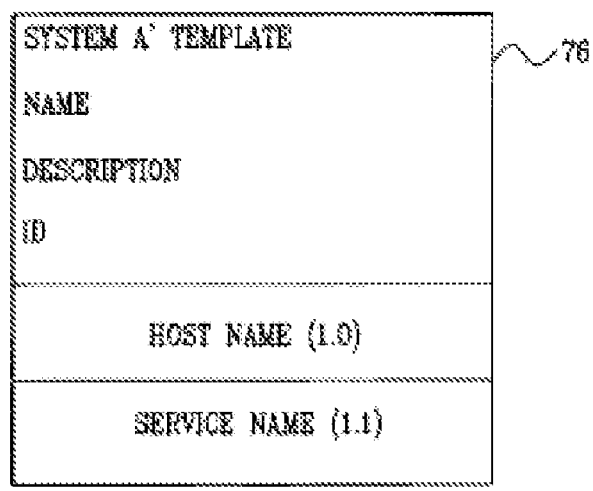
FIG. 6 is a detailed block diagram of a system template shown in FIG. 5, in accordance with a disclosed embodiment of the invention.

Reference is now made to FIG. 6, which is a detailed block diagram of the system template 76 (FIG. 5), in accordance with a disclosed embodiment of the invention. The system template 76 has the properties "Name", "Description", and "ID", which are derived from the generic system template 62 (FIG. 5). The system template 76 has the property "Host Name 1.0", which is derived from the new system template 70, and a unique new property, "Service Name (1.1)". When creating the system template 76, the wizard, or administrator, if the process is performed manually, will be aware of existing properties embodied in the generic system template 62 and the system template 70. The existing properties are adapted to the new connector being formed, typically by forming links among the templates. It is an advantage of some aspects of the present invention that the properties acquired by subsequent system templates, e.g., a template needed to handle a newly released version of the data source 64 (FIG. 5), e.g., "Service Name 1.3", would take on the properties of the generic system template 62, the system template 70, and the system template 76. Only properties of the new version that are not found in previous versions of the data source 64 would need to be added. The chain of system templates thus formed can be extended indefinitely for use in newly deployed connectors needed to access upgrades or updated versions of the data source 64.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

---

COMPUTER PROGRAM LISTINGS

Listing 1

```
IConnection connection = null;
try { // get the Connector Gateway Service
    Object connectorservice =
PortalRuntime.getRuntimeResources( ).getService( IConnectorService.KEY);
    IConnectorGatewayService cgService =(IConnectorGatewayService)
connectorservice;
    if (cgService == null) {
        response.write("Error in get Connector Gateway Service <br>");
    }
    try {
        connection = cgService.getConnection(sapsystem, request);
    } catch (Exception e) {
        response.write("Connection to SAP system failed <br>");
    }
    if (connection == null) {
        response.write("No connection <br>");
    }
    else {
        response.write("Connection succesful");
    }
} catch (Exception e) {
    response.write("Exception occurred");
}
```

Listing 2

```xml
<?xml version="1.0" encoding="ISO-8859-1" ?>
 - <components>
     - <component name="A_system">
         - <component-profile>
                 <property name="com.sap.portal.Name" value="" />
                 <property name="com.sap.portal.ID" value="" />
                 <property name="com.sap.portal.Description" value="" />
                 <property name="com.sap.portal.HostName1_0" value="" />
             </component-profile>
         </component>
     - <component name="A'_system">
         - <component-profile>
                 <property name="CodeLink" value="A_system" />
                 <property name=
                         "com.sap.portal.ServiceName1_1" value=""/>
             </component-profile>
         </component>
     - <component name="A"_system">
         - <component-profile>
                 <property name="CodeLink" value="A_system" />
                 <property name=
                         "com.sap.portal.ServiceName1_2" value="" />
             </component-profile>
         </component>
</components>
```

Listing 3

```xml
<?xml version = "1.0" encoding="utf-8"?>
<application>
    <application-config>
        <property name="ServicesReference"
            value="com.sap.portal.pcd.glservice,
            com.sap.portal.ivs.systemlandscapeservice,
            com.sap.portal.pcmbuilderservice,
            com.sap.portal.ivs.iviewservice,
            com.sap.portal.ivs.internalconnector,
            usermanagement,
            com.sap.portal.ivs.connectorservice,
            com.sap.portal.common.commonservices,
            SAPJ2EE::library:com.sap.portal.common,
            SAPJ2EE::library:com.sap.portal.services.api,
            SAPJ2EE::library:com.sap.portal.services.internal.api"/>
        <property name="Vendor" value="sap.com"/>
        <property name="SecurityArea" value="NetWeaver.Portal"/>
```

COMPUTER PROGRAM LISTINGS
-continued

```xml
</application-config>
<components>
    <component name="SLConnectorHelperTest">
        <component-config>
            <property name="SafetyLevel" value="low_safety"/>
            <property name="ClassName"
              value="com.sap.portal.ivs.sl.
                    connector.helper.SLConnectorHelperTest"/>
        </component-config>
        <component-profile/>
    </component>
    <component name="generic_connector_system">
        <component-config>
            <property name="SafetyLevel" value="low_safety"/>
            <property name="ClassName" value=""/>
        </component-config>
        <component-profile>
            <property name="com.sap.portal.pcm.Title"
                value="Generic Connecotr-based system"/>
            <property name="ComponentType"
                value="com.sapportals.portal.system">
                <property name="plainDescription"
                    value="Component Type"/>
                <property name="administration"
                    value="DIALOG-READ-ONLY"/>
            </property>
            <property name=
                "com.sap.portal.reserved.system.
                    ConnectionFactoryClass">
                <property name="plainDescription"
                    value="Connection Factory Class"/>
            </property>
            <property name=
                "com.sap.portal.reserved.system.ConnectionGroup">
                <property name="personalization" value="NONE"/>
                <property name="type" value="String"/>
                <property name="plainDescription"
                    value="Connection Group"/>
                <property name="administration"
                    value="DIALOG-READ-ONLY"/>
            </property>
            <property name=
                "com.sap.portal.reserved.system.
                    category" value="None SAP">
                <property name="personalization" value="NONE"/>
                <property name="type" value="String"/>
                <property name="plainDescription"
                    value="System category"/>
                <property name="longDescription"
                    value="The system category used
                        for grouping systems"/>
                <property name="administration"
                    value="DIALOG-READ-ONLY"/>
            </property>
        </component-profile>
    </component>
    <component name="ConnectorSystemCreatorTest">
        <component-config>
            <property name="SafetyLevel" value="low_safety"/>
            <property name="ClassName"
                value="com.sap.portal.connectivity.systems.
                    ConnectorSystemCreatorTest"/>
        </component-config>
        <component-profile/>
    </component>
</components>
<services>
    <service name="SLConnectorHelper">
        <service-config>
            <property name="className"
                value="com.sap.portal.ivs.sl.connector.
                    helper.SLConnectorHelper"/>
            <property name="SafetyLevel" value="high_safety"/>
        </service-config>
    </service>
    <service name="ConnectorSystemCreator">
        <service-config>
```

-continued

COMPUTER PROGRAM LISTINGS

```xml
            <property name="className"
                value="com.sap.portal.connectivity.systems.
                    ConnectorSystemCreator"/>
            <property name="SafetyLevel" value="high_safety"/>
        </service-config>
    </service>
  </services>
</application>
                                        Listing 4
<?xml version="1.0" encoding="ISO-8859-1" ?>
- <application>
    - <application-config>
            <property name="Vendor" value="sap.com" />
            <property name="SecurityArea" value="NetWeaver.Portal" />
            <property name="ServicesReference" value="" />
            <property name="releasable" value="true" />
      </application-config>
  <components>
  - <component name="jdbc_system">
  - <component-config>
            <property name="ClassName" value="" />
            <property name="SafetyLevel" value="medium_safety" />
      </component-config>
  - <component-profile>
       <property name="com.sap.portal.pcm.Title" value="JDBC system" />
  - < property
                  name="com.sap.portal.reserved.system.ConnectionFactoryClass"
                  value="JDBCFactory">
                  <property name="plainDescription" value="Connection Factory
                  Class" />
              </property>
    - <property name="ComponentType"
                  value="com.sapportals.portal.system" >
              <property name="plainDescription" value="ComponentType" />
              <property name="administration"
              value="DIALOG-READ-ONLY" />
              </property>
    - <property name="url" value="">
              <property name="personalization" value="Dialog" />
              <property name="type" value="String" />
              <property name="category" value="Connection Properties" />
              <property name="plainDescription" value="Connection URL" />
              <property name="longDescription" value="The jdbc url to connect
                  with" />
              <property name="defaultvalue" value="" />
  </property>
              - <property name="driver" value="">
                  <property name="personalization" value="Dialog" />
                  <property name="type" value="String" />
                  <property name="category"
                  value="Connection Properties" />
                  <property name="plainDescription"
              value="Driver Class Name" />
                  <property name="longDescription"
                  value="The jdbc driver to connect with" />
                  <property name="defaultvalue" value="" />
              </property>
                - <property name="ConnectionTimeout" value="">
                  <property name="personalization" value="Dialog" />
                  <property name="type" value="integer" />
                  <property name="category" value="Connection Properties" />
                  <property name="plainDescription"
              value="Connection Timeout" />
                  <property name="longDescription"
                  value="The maximum length of
                  time to wait for a connection" />
                  <property name="defaultvalue" value="" />
                  </property>
                    - <property name="ValidateAlive" value="false">
                    <property name= "category"
                    value="Connection Properties" />
                    <property name="validvalues" value="4/true5/false" />
                    <property name="personalization" value="Dialog" />
                    <property name="type" value="String" />
                    <property name="plainDescription"
                    value="Validate Connection" />
                    <property name="longDescription"
```

-continued

```
COMPUTER PROGRAM LISTINGS
                        value="Validates the physical
                             connection. The default is 'false'.
                             Changing the value to 'true'
                             triggers a time-consuming process.
                             You might want to validate
                             the connection, for example,
                             in a firewall environment." />
                        <property name="defaultvalue" value="false" />
                        </property>
                        - <property name="usermappingtype" value="">
                        <property name="validvalues"
                             value="4/user5/admin10/admin,user" />
                        <property name="category" value="User Management" />
                        <property name="personalization" value="Non-Dialog" />
                        <property name="type" value="String" />
                        <property name="plainDescription"
                             value="User Mapping Type" />
                        <property name="longDescription"
                             value="type of user mapping for connection" />
                        <property name="defaultvalue" value="" />
                        </property>
                        - <property name=
                        "com.sap.portal.reserved.system.category"
                             value="JDBC Systems">
                        <property name= "category" value="Information" />
                        <property name="personalization" value="NONE" />
                        <property name="type" value="String" />
                        <property name="plainDescription" value="System
                             category" />
                        <property name="longDescription" value="the system
                             category
                             used for grouping systems" />
                        <property name="defaultvalue" value="JDBC Systems" />
                        <property name="administration"
                             value="DIALOG-READ-ONLY" />
                        </property>
                  </component-profile>
                  </component>
      </components>
      <services />
</application>
```

The invention claimed is:

1. A computer-implemented method for registering a data source in a portal, comprising the steps of:
creating a connector in said portal for said data source;
interrogating said data source via said connector to determine properties of said data source;
providing a generic system template, said generic system template being extendible by addition of new properties; and
constructing a new system template that is adapted for accessing said data source via said connector, said new system template providing a reference to a combined set of properties comprising properties of said data source that are present in said generic system template and properties of said data source that are absent in said generic system template.

2. The method according to claim 1, wherein constructing a new system template comprises establishing links between said new system template and said generic system template.

3. The method according to claim 1, further comprising the steps of:
repeating said step of interrogating said data source, using a new version of said data source as said data source; and
constructing a second new system template that is adapted for accessing said new version of said data source, said second new system template having properties of said new version of said data source that are present in said generic system template and said new system template and having properties of new version of said data source that are absent in said generic system template and said new system template.

4. The method according to claim 1, further comprising the step of processing in said portal client requests to access said data source using said new system template and said connector.

5. The method according to claim 1, wherein said step of interrogating said data source is performed using a wizard.

6. The method according to claim 1, wherein said connector operates in a platform-independent connector framework.

7. The method according to claim 1, further comprising the step of operating said portal in a platform-independent execution environment.

8. A computer software product for registering a data source in a portal, including a non-transitory computer-readable medium in which computer program instructions are stored, which instructions, when read by a computer, cause the computer to create a connector for said data source, and to access a generic system template comprising a plurality of template properties of said data source, said generic system template being extendible by addition of new properties of said data source;
to interrogate said data source via said connector to determine properties of said data source; and to construct a new system template that is adapted for accessing said data source via said connector, by augmenting said generic system template so as to include ones of said properties that are absent in said generic system template in said new system template.

9. The computer software product according to claim 8, wherein constructing a new system template comprises establishing links between said new system template and said generic system template.

10. The computer software product according to claim 8, wherein said computer is further instructed to repeatedly interrogate said data source, using a new version of said data source as said data source; and to construct a second new system template that is adapted for accessing said new version of said data source by reusing said generic system template and said new system template so as to include properties of said new version of said data source that are absent in said generic system template and said new system template in said second new system template.

11. The computer software product according to claim 8, wherein said computer is further instructed to process in said portal client requests to access said data source using said new system template and said connector.

12. The computer software product according to claim 8, wherein said computer is further instructed to interrogate said data source by executing a wizard.

13. The computer software product according to claim 8, wherein said connector operates in a platform-independent connector framework.

14. The computer software product according to claim 8, further comprising the step of operating said portal in a platform-independent execution environment.

15. A portal system having a capability for registering a data source, comprising:
    a computer server;
    a hardware client interface for linking said server to a plurality of clients via a data network; and
    at least one hardware data interface for linking said server to said data source,
    wherein said computer server is operative for executing portal runtime software, said runtime software including a connector framework and a generic system template, said generic system template being extendible by addition of new template properties, said runtime software being operable to create a connector in said portal system for said data source, to interrogate said data source via said connector to determine properties of said data source, and to construct a new system template that is adapted for accessing said data source via said connector to include in said new system template ones of said properties of said data source that are absent in said generic system template.

16. The portal system according to claim 15, wherein said runtime software is further instructed to construct said new system template by establishing links between said new system template and said generic system template.

17. The portal system according to claim 15, wherein said runtime software is operable to interrogate a new version of said data source; and to construct a second new system template that is adapted for accessing said new version of said data source by augmenting said generic system template and said new system template so as to include properties of said new version of said data source that are absent in said generic system template and said new system template in said second new system template.

18. The portal system according to claim 15, wherein said runtime software is operable for processing in said portal client requests to access said data source using said new system template and said connector.

19. The portal system according to claim 15, wherein said runtime software is operable for executing a wizard to interrogate said data source therewith.

20. A method of operating an enterprise, comprising the steps of:
    providing a portal system having a capability for registering a data source, said portal system comprising a server, a client interface for linking said server to a plurality of clients via a data network, and at least one data interface for linking said server to said data source;
    executing portal runtime software in said server, said runtime software including a connector framework and a generic system template, and said runtime software extending said generic system template by addition of new template properties, said runtime software being operable to create a connector in said portal system for said data source, to interrogate said data source via said connector to determine properties of said data source, and to construct a new system template that is adapted for accessing said data source via said connector, wherein said new system template includes one or more of said properties of said data source that are absent in said generic system template;
    connecting new data sources to said server;
    registering said new data sources in said portal system using said generic system template and respective instances of said new system template; and
    processing requests arriving at said server via said client interface from said clients for access to said new data sources to display information obtained from said new data sources in said clients.

* * * * *